United States Patent

[11] 3,596,344

| [72] | Inventor | Kenneth G. Kreider<br>Glastonbury, Conn. |
| --- | --- | --- |
| [21] | Appl. No. | 763,279 |
| [22] | Filed | Sept. 27, 1968 |
| [45] | Patented | Aug. 3, 1971 |
| [73] | Assignee | United Aircraft Corporation<br>East Hartford, Conn. |

[54] METHOD OF FABRICATING FIBER-REINFORCED ARTICLES
7 Claims, 2 Drawing Figs.

[52] U.S. Cl. .................................................. 29/419,
29/191.4, 29/191.6, 117/128
[51] Int. Cl. ........................................................ B23p 17/00
[50] Field of Search............................................ 29/419,
191.2, 191.4, 191.6; 117/128

[56] References Cited
UNITED STATES PATENTS

| 2,857,657 | 10/1958 | Wheeler | 29/191.4 X |
| --- | --- | --- | --- |
| 2,903,787 | 9/1959 | Brennan | 29/419 |
| 3,303,006 | 2/1967 | Morley et al. | 55/25 |
| 3,427,185 | 2/1969 | Cheatham et al. | 29/191.4 X |
| 3,443,301 | 5/1969 | Basche et al. | 29/191.2 X |
| 3,161,478 | 12/1964 | Chessin | 29/191.2 |

*Primary Examiner*—John F. Campbell
*Assistant Examiner*—D. C. Reiley
*Attorney*—John D. Del Ponti

ABSTRACT: An improved process of fabricating a multilayer fiber-reinforced metal matrix composite by winding a filament on a spring-loaded mandrel, preheating the mandrel, plasma arc spraying metal matrix material in coalescent form onto the filament windings to form a composite layer, forming additional composite layers by repeating the steps of winding, preheating and spraying and subjecting the resulting multilayer composite to heat and pressure.

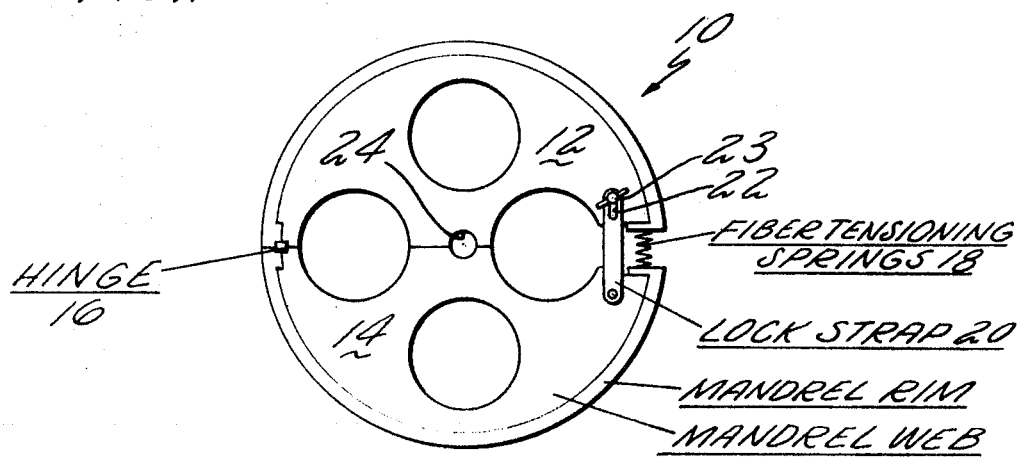
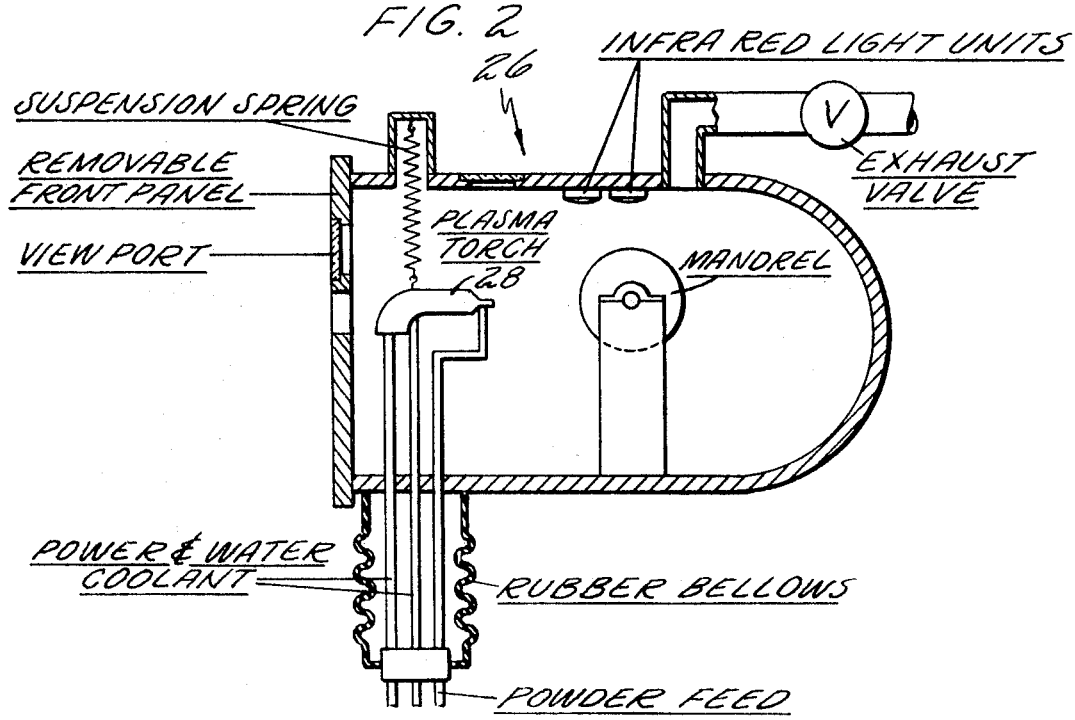

METHOD OF FABRICATING FIBER-REINFORCED ARTICLES

The invention herein described was made in the course of or under a contract or subcontract thereunder, with the Department of the Air Force.

BACKGROUND OF THE INVENTION

The present invention relates to the production of fiber-reinforced composites and more particularly relates to the production of multilayer fiber-reinforced composites by successive steps of winding, preheating and plasma arc spraying, followed by a secondary heat treatment which improves the ductility and strength of the matrix.

It is known that fiber strengthening offers the potential of significant improvements in the fabrication of composite structural materials designed to meet the imposing requirements of space-age hardware. The concept of fiber strengthening is based on the fact that materials produced in the fibrous form frequently exhibit a higher elastic modulus and a larger elastic strain capacity and, hence, higher stiffness and strength than the corresponding materials in bulk. The development of structural high modulus composites has received considerable attention in the past few years and progress has been made in the production of high-strength, high-quality fibers, such as boron and silicon carbide, for example. These fibers combine the high strength of fiber glass with a high modulus and suggest the feasibility of fabricating fiber-reinforced structures having a superior balance of strength and stiffness. In order to exploit these properties, it is necessary to gather these fibers together into a composite structure in such a way that failure in several isolated fibers will not be transmitted to the surrounding fibers, and further, to distribute the load with reasonable uniformity over the entire fiber bundle. One method of effecting this result is to encase multiple layers of uniformly distributed fibers in a matrix material which will deform plastically. The achievement of such high modulus composites having a high strength to density ratio is dependent on several primary factors.

In order to be structurally efficient, the matrix material must possess high strength and large elongation capabilities. High strength is necessary in order to transfer stresses between fibers so that discontinuous fibers are reloaded. The plastic strain capability must be high enough to resist fracture under severe localized strain, particularly at fiber fracture ends and between fiber layers.

Additionally, the residual stresses in the composite caused by differences in thermal contraction between the fiber and matrix during cooling must be minimized. It has been found that the difference between the coefficients of thermal expansion of, for example, boron fibers and an aluminum matrix can result in 0.5 percent strain upon cooling from 400° F with the matrix in residual tension.

Furthermore, it is necessary in a fiber-reinforced composite that the fibers be uniformly spaced in order to achieve high matrix tensile strength and uniform off axis properties. One of the most important factors for producing uniform spacing is the provision of a flat and smooth winding surface or substrate.

Finally to be commercially feasible, a process which achieves the above-desired properties must be able to achieve them consistently so that the product composite will be highly reproducible.

One of the paramount problems in obtaining high-strength, high-modulus composite articles involves the actual process of incorporating fibers into the matrix material to provide the desired end item. Several prior art processes have been employed for he fabrication of metal matrix composites. These include such techniques as molten metal infiltration, vapor deposition, electrodeposition, eutectic solidification and plasma arc spraying. One example of the latter method is described in an application filed Feb. 19, 1964 by Robert G. Cheatham and Joseph F. Cheatham, Ser. No. 346,388, now U.S. Pat. No. 3,427,185 entitled *Composite Structural Material Incorporating Metallic Filaments in a Matrix and Method of Manufacture*, which shares a common assignee with the instant invention. In that process, multiple layers of filaments are incorporated in a metal matrix by arranging a filament or mat of filaments directly on a mandrel, plasma spraying a metal matrix thereon and subsequently repeating the winding and spraying steps on each preceding composite fiber-matrix layer for the desired number of times. In other words, a multilayer composite is produced by building up alternate layers of fiber and metal matrix on each other.

Although the prior art processes result in fiber-reinforced metal matrix composites of increased strength to density and modulus to density ratios, their structural efficiency is impaired by a relatively weak bonding between composite layers, particularly where there is a high fiber volume fraction, and by residual stress concentrations caused by different coefficients of thermal expansion for the fibers and the matrix which are difficult to control with respect to uniformity and severity. Furthermore, fiber spacing, which is apparently critical in off axis strength, is uneven because the substrate for the filament winding is not flat after several layers have been built up. Still further, the prior art processes are difficult to pursue when attempting to make multilayered composites of complex shape since the ability to wind monofilaments to such a shape with the requisite degree of uniformity is greatly limited. On a broad scale then, there is a serious reproducibility problem associated with the above techniques which stems basically from an inability to insure that the filaments and hence the matrix material will be provided in the same location, in the same quantity, and in the same quality in each article. Quite to the contrary, articles produced by the foregoing methods may vary significantly with respect to their physical properties despite the most careful attention to process details.

SUMMARY OF THE INVENTION

The present invention relates to fiber-reinforced articles and, more particularly, to an improved process for fabricating such articles to provide a maximum and uniform fiber fill, as desired, and impart reproducibility to the fabrication from one article to the next. It contemplates the use of filaments as for example boron, silicon carbide or boron coated with silicon carbide and a metal matrix material as for example aluminum or magnesium to make multilayer composites.

In accordance with one aspect of the present invention, a multilayer composite is produced from a plurality of single plasma sprayed composite monolayers which are fabricated in succession, one upon the other, under substantially identical circumstances with respect to stress and temperature. A single filament is wound in helical collimated relation on a foil-covered, mechanically expandable mandrel. The filament is pretensioned and the mandrel is preheated to a predetermined level and a metal matrix material is applied by plasma arc spraying. The resulting composite monolayer, possessing excellent filament-matrix bonding characteristics with no signs of fiber degradation, is used as a substrate for the formation of an additional composite monolayer which in turn acts as a substrate for the next. After completion of filament winding on each substrate and prior to spraying, the substrate is preheated. As a final step, the resulting multilayer composite is subjected to hot pressing in a nonoxidizing atmosphere.

By means of the present invention, not only is the production of structural high modulus multilayer composites attained, but composites so produced are possessed of superior properties. The process is simple and inexpensive, and yields well-spaced fibers with a minimum of residual stress in the composite. Strong fiber-matrix as well as matrix-matrix bonding is achieved without fiber degradation. As a consequence of the teachings herein, a high-strength, high-modulus metal matrix composite is achieved in a manner heretofore unknown.

BRIEF DESCRIPTION OF THE DRAWINGS

FIG. 1 is a side-elevational view of a mandrel used during composite fabrication; and FIG. 2 is a side-elevational view, partly in section, of a plasma spray chamber.

DESCRIPTION OF THE PREFERRED EMBODIMENTS

Referring now to the drawings, wherein like numerals 22 like parts, the numeral 10 designates a hollow, cylindrical, diametrically split mandrel comprised of a pair of matching semicylindrical pieces 12 and 14. The mandrel pieces are secured together at their interface by a hinge 16 at one end and are pivotally separable to a controlled degree by means of a pair of springs 18 and a locking strap 20 located at the opposite end. The strap 20 has a longitudinal slot 22 adjacent one end. A thumbscrew 23, having an enlarged head, is suitably received in the slot 22 and is operable to lock the mandrel in a spring-expanded position. The mandrel 10 has a central axial passageway 24 adapted for receipt of an appropriate driving shaft (not shown) so that the mandrel is both rotatable and axially movable.

According to the practice of the invention, with the springs biasing the pieces outwardly, the mandrel is locked in the open position and a selected sheet of metal foil is laid in a single layer in covering relation over the entire cylindrical surface thereof in a smooth and uniform manner. In order to prevent wrinkling during fabrication, the foil is preferably of a material which is thermally compatible with the mandrel, that is, it must have a coefficient of expansion which is substantially the same therewith. One of the primary advantages for using metal foil as a substrate material is the fact that it improves the handling characteristics of the multilayer composite and gives it an increased degree of toughness. As explained hereinafter, the foil is first made adherent to the plasma sprayed matrix material and is subsequently incorporated therein.

Filamentary material is selected and wound in a closely laid, evenly spaced helical convolutions on the foil. This can be accomplished by drawing continuous filament from a supply reel, securing the end of the filament adjacent the side of the mandrel, and guiding the filament under winding tension, by suitable pay off means while the mandrel is rotated. The exact mechanism by which the fiber is laid on the foil substrate is not considered part of the present invention and those skilled in the art will recognize that there are many alternative schemes for placing filaments, in tension, on a mandrel in a collimated manner. By the term collimated is meant the state wherein adjacent fiber lengths are evenly and uniformly spaced from each other and such a concept is equally applicable to a single fiber helically wound on the mandrel or a plurality of fibers wound on the mandrel and residing in parallel planes.

Upon completion of the winding, the filament is broken and affixed to the mandrel and the restraining strap 20 is released. The mandrel is then positioned in a plasma spray chamber 26 where deposition of the metal matrix material by means of a plasma torch 28 can be accomplished in an argon atmosphere. Prior to spraying, the mandrel, metal foil and wound filaments are preheated to a temperature sufficiently high to assure bonding of the matrix to the foil and the fiber during plasma spraying. The actual heating is accomplished both by infrared heating and by the plasma torch. In the case of aluminum foil, a temperature between 400° and 600° F. results in good adherence while a temperature below 200° results in nonadherence. During spraying, the mandrel is rotated and traversed in front of the stationary plasma arc in order to obtain an even layer of matrix material. Variables which affect the plasma flame are the power input to the arc, the geometry and size of the arc electrodes, and the composition and flow rate of the plasma gas. Deposits were made with 400—500 amperes, 30—35 volts, and 140—160 cu.ft./hr. STP of argon. In addition to these variables, the deposit is affected by controlling the rate of powder feed, the position of the powder feed inlet hole of the plasma, the size distribution of the powder, the torch to substrate distance, the nature of atmosphere surrounding the plasma exhaust flame and the substrate, and the substrate temperature. Composites were made with a moderate feed rate with respect to saturation (3 pounds per hour of metal powder spray), the powder inlet located in the ionizing zone of the arc, −240+400 mesh size spherical metal powder, a 4 to 5 inch arc to substrate distance, an argon atmosphere, a substrate temperature of 400°—600° f. and a relative velocity of the plasma spray arc across the substrate of 2 to 8 inches per second.

The instant technique of preheating and plasma spraying not only causes the coalescent particles of matrix metal to encase the fibers and adhere to them, but at the same time causes the mandrel to thermally expand so as to operate against the bias of springs 18 and cause the mandrel pieces 12 and 14 to close. The mechanical contraction of the thermally expanding mandrel minimizes the variations of tensile strain to which the filaments would otherwise be subject. When the spraying is complete, the tape and the mandrel are cooled to room temperature and during the cooling process, the opposite compensatory mandrel action occurs. The thermally contracting mandrel is mechanically expanded by the coefficients of thermal expansion of the fibers and matrix is accounted for. In all, the fibers are subjected to not greater than 0.3 percent strain at spraying temperature.

After cooling, the composite layer is preferably sanded or rolled to obtain a smooth flat surface for winding. That composite layer acts as a substrate for the succeeding layer. To continue fabrication, a new length of filamentary material is wound in closely laid, evenly spaced helical convolutions and the substrate is preheated to assure interlayer bonding. Once preheating is effected, the filaments are plasma sprayed and the foregoing steps are repeated in succession until the desired number of layers are built up, one upon the other on the mandrel. The multilayer composite, in order to improve the density and ductility of the matrix, is then subjected to secondary fabrication. The preferred mode is hot pressing in a nonoxidizing atmosphere. The composite is cut transversely, removed from the mandrel and placed between steel platens or dies and subjected to a predetermined pressure and temperature.

Various experiments were conducted to establish the efficiency of the techniques hereinbefore described. During these experiments, an aluminum mandrel 6 inches wide and 20 inches in diameter was provided with a pair of auto-valve springs, each having a spring constant of 900 lb./in. The strap 20 was operable to lock the mandrel at a maximum separation distance of one-fourth inch. Aluminum matrix materials were at various times applied to boron, silicon carbide and silicon carbide coated boron filaments. It is to be understood that whenever the word aluminum is used herein, it includes reference not only to the pure metal but also to the aluminum base alloys. The fiber, matrix and foil materials used in the fabrication of composites re enumerated in Table I.

TABLE I.—MATERIALS FOR COMPOSITE FABRICATION

| Fiber | Diameter in inches | Modulus $10^6$ p.s.i. | Average ultimate tensile strength, p.s.i. | Source |
|---|---|---|---|---|
| Boron | .0039–.0041 | 55–60 | 425,000–500,000 | UARL.[1] |
| Boron with .00010–.00015 in. SiC coating (BORSIC). | .0039–.0041 | 55–60 | 425,000–500,000 | UARL.[1] |
| SiC | .0027–.0033 | >50 | 275,000–400,000 | UARL.[1] |

| Metal powder | Type | Size range | Source |
|---|---|---|---|
| 1100-commercially pure aluminum. | Spheroidized | 15–44 micron | Thermal Dynamics. |
| 6061 aluminum alloy [2] | Atomized | −270+400 mesh. | Reynolds Metal Co. |
| 2024 aluminum alloy [3] | do | do | Alcoa. |

| Metal foil | Type | Thickness, in. | Source |
|---|---|---|---|
| 1100 | Annealed | 0.001 | "Kitchen-Wrap". |
| 6061 | do | 0.001–0.003 | Reynolds. |

[1] United Aircraft Research Labs.
[2] 1.0% Mg; 0.5% Si; Balance Al.
[3] 4.5% Cu; Balance Al.

Considerable fabrication development was performed utilizing a system of plasma sprayed 6061 aluminum alloy powder, BORSIC fiber and 1145 aluminum alloy .001 inch thick foil. Composites were also fabricated with silicon carbide fiber and boron fiber.

The hot pressing technique is used for BORSIC fiber-aluminum alloy and boron fiber-aluminum alloy matrix composites. A suitable hot pressing cycle to obtain fully dense and strong, ductile matrix as found to be 500° C at 4000 p.s.i. for 1 hour. Lower pressures are required at higher temperatures i.e., 1,000 p.s.i. at 600° C. At 560° C however, very serious boron fiber degradation results, which is not a problem with the silicon carbide coated boron fiber (BORSIC). Fibers removed from the composite with dilute hydrochloric acid show a degradation in average strength from 480,000 to 130,000 p.s.i. and the composites are weak (78,000 p.s.i. with 41 percent volume of boron). At 490° C significant degradation also occurs in the fibers (approximately 25 percent) and the composites do not have strengths as high as those hot pressed at lower temperatures. With a temperature of 400° C and a pressure of 1,000 p.s.i., boron-aluminum tapes do not achieve full densification and the matrix is somewhat brittle. A pressure of 10,000 p.s.i., however, results in full densification.

The results of the above hot pressing procedures indicate the practical advantages, particularly where large composite structures are to be fabricated, of employing the highest temperature consistent with retention of desirable fiber properties. The higher the temperature, the lower the pressure required for full densification.

EXAMPLES

Various composites produced by he foregoing technique were subjected to mechanical property evaluation. The parameters and properties are set forth in Table II.

TABLE II

Fabrication Parameters and Mechanical Properties of Plasma Sprayed Composites

| | 0226 | 0250 | 0256 |
| --- | --- | --- | --- |
| Fiber | 0.004 in. Boron | 0.0042 in. BORSIC | 0.003 in. Silicon Carbide |
| No. of Layers | 11 | 8 | 8 |
| Fiber Spacing | 0.0062 in. | 0.0062 in. | 0.005 in. |
| Plasma Power | 14 KVA | 14 KVA | 16 KVA |
| Plasma Gas | 150 cu. ft./hr. Argon | 150 cu. ft./hr. Argon | 170 cu. ft./hr. Argon |
| Preheat Temp. | 400°F. | 500°F. | 450°F. |
| Hot Press | 750°F., 10,000 p.s.i., 1 hr. | 930°F., 4,000 p.s.i., 1 hr. | 930°F., 10,000 p.s.i., 1 hr. |
| Volume Fiber | 52 % | 42 % | 32% |
| Young's Modulus | 31.5 × 10⁶ p.s.i. | 28 × 10⁶ p.s.i. | 21 × 10⁶ p.s.i. |
| Ultimate Tensile Strength | 162,000 p.s.i. | 163,000 p.s.i. | 69,000 p.s.i. |

In the practice of the present invention, it is recognized that modifications can be made. It is recognized for example, that plasma spraying can be performed in air in order to promote a simpler and less expensive technique. In order to promote good bonding between aluminum layers successively sprayed in air however, it is preferable to grit blast the surface between layers with fine alumina powder. Multilayer composites sprayed in air were diffusion bonded and it was determined that there is no significant difference in their microstructure as compared to those sprayed in argon. Their properties were also found to be nearly equivalent to those fabricated in an argon atmosphere.

It will readily be seen that, through the use of the techniques hereinbefore described, fiber-reinforced articles of carefully controlled density can readily and reproducibly be fabricated. While the invention has been described with reference to specific examples, fabrication parameters and materials, these embodiments and conditions are intended to be illustrative only. Various modifications and alternatives, other than those already mentioned, will be readily evident to those skilled in the art within the true spirit and scope of the invention as set forth in the appended claims.

What I claim is:

1. In a method for forming a metal matrix filament-reinforced structural material by plasma arc spraying coalescent metal matrix material on the filaments, the improvement which comprises:
   wrapping a layer of metallic foil on a mandrel;
   winding a filament in a helically collimated monolayer on said foil;
   preheating said mandrel to a temperature sufficient to cause bonding between the foil, filament and matrix during spraying;
   depositing said metal matrix in coalescent form on said filament by plasma arc spraying to encase said filaments and to form a composite layer;
   forming additional composite layers characterized by a strong interlayer bond by repeating the steps of winding said filament in a helically collimated monolayer on the previous composite layer, preheating the previous composite layer to a temperature sufficient to cause bonding between the foil, filament and matrix during spraying, nd depositing the metal matrix in coalescent form on said filament by plasma arc spraying; and
   subjecting the multilayer composite to hot pressing.

2. The improvement of claim 1 wherein said filament is of a material selected from the group consisting of boron, silicon carbide and silicon carbide coated boron.

3. The improvement of claim 2 wherein said matrix material is aluminum.

4. The improvement of claim 3 wherein said foil is aluminum.

5. The improvement of claim 4 wherein said mandrel is aluminum.

6. The improvement of claim 5 wherein said preheating temperature is within a range of 400° to 600° F.

7. The improvement of claim 6 wherein said mandrel is spring loaded so that at spraying temperature, the filament is subjected to not greater than 0.3 percent strain.